(12) United States Patent
Umezawa et al.

(10) Patent No.: US 11,053,825 B2
(45) Date of Patent: Jul. 6, 2021

(54) EXHAUST GAS PURIFICATION APPARATUS FOR INTERNAL COMBUSTION ENGINE

(71) Applicant: TOYOTA JIDOSHA KABUSHIKI KAISHA, Toyota (JP)

(72) Inventors: Koji Umezawa, Susono (JP); Kinji Morihiro, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 91 days.

(21) Appl. No.: 16/697,345

(22) Filed: Nov. 27, 2019

(65) Prior Publication Data
US 2020/0182116 A1    Jun. 11, 2020

(30) Foreign Application Priority Data

Dec. 7, 2018   (JP) .............................. JP2018-230021

(51) Int. Cl.
*F01N 3/10*   (2006.01)
*F02D 41/14*   (2006.01)

(52) U.S. Cl.
CPC .......... *F01N 3/105* (2013.01); *F02D 41/1439* (2013.01); *F02D 41/1473* (2013.01)

(58) Field of Classification Search
CPC .................. F01N 3/105; F01N 2560/14; F01N 2900/0416; F01N 2900/1624; F01N 9/00; F01N 2560/025; F01N 2430/06; F01N 13/009; F01N 3/20; F02D 41/1439; F02D 41/1473; F02D 41/1456; F02D 41/1475; F02D 2200/0814; F02D 41/1441; F02D 41/0295; Y02T 10/40

See application file for complete search history.

(56) References Cited

U.S. PATENT DOCUMENTS

| | | | | |
|---|---|---|---|---|
| 5,331,809 A | * | 7/1994 | Takeshima | ............ F01N 3/2046 60/288 |
| 5,970,707 A | * | 10/1999 | Sawada | ............... F02D 41/1441 60/277 |
| 6,176,079 B1 | * | 1/2001 | Konrad | ................. F01N 3/0814 60/274 |

(Continued)

FOREIGN PATENT DOCUMENTS

| | | |
|---|---|---|
| EP | 3486466 A1 | 5/2019 |
| JP | 2015-071959 A | 4/2015 |

*Primary Examiner* — Joseph J Dallo
(74) *Attorney, Agent, or Firm* — Oliff PLC (57) ABSTRACT

A decrease in purification performance of a system as a whole is suppressed in cases where catalysts are arranged in an upstream side portion and in a downstream side portion of an exhaust passage in an internal combustion engine. A first catalyst, a sensor and a second catalyst are sequentially arranged in the exhaust passage of the internal combustion engine, wherein a switch is made between lean control and rich control in such a manner that an amount of increase or decrease in a storage amount of oxygen falls within a predetermined range, and in cases where the rich control is carried out after performing a predetermined number of times of rich control, the rich control is continued until an air fuel ratio detected by the sensor becomes equal to or less than a rich determination threshold value which is smaller than a stoichiometric air fuel ratio.

2 Claims, 9 Drawing Sheets

(56) References Cited

U.S. PATENT DOCUMENTS

| | | | | |
|---|---|---|---|---|
| 7,055,311 | B2* | 6/2006 | Beutel | B01D 53/9495 60/285 |
| 8,141,344 | B2* | 3/2012 | Miyashita | F02D 41/1458 60/285 |
| 8,186,149 | B2* | 5/2012 | Satoh | B01D 53/9422 60/285 |
| 9,115,660 | B2* | 8/2015 | Sakurai | F01N 3/208 |
| 2003/0066287 | A1* | 4/2003 | Hirota | F01N 3/025 60/297 |
| 2004/0006971 | A1* | 1/2004 | Kamoto | F01N 11/007 60/277 |
| 2008/0289322 | A1* | 11/2008 | Hagimoto | F01N 13/009 60/299 |
| 2008/0307772 | A1* | 12/2008 | Kawamura | F02D 41/1466 60/285 |
| 2013/0152552 | A1* | 6/2013 | Sakurai | F01N 3/0885 60/285 |
| 2016/0108839 | A1* | 4/2016 | Nogi | F01N 11/002 60/286 |
| 2017/0304772 | A1* | 10/2017 | Onoe | B01D 53/94 |
| 2018/0094558 | A1* | 4/2018 | Hagimoto | F01N 3/208 |
| 2018/0216553 | A1* | 8/2018 | Hashizume | F02D 41/402 |
| 2019/0040784 | A1* | 2/2019 | Sakai | F01N 13/009 |
| 2019/0136737 | A1* | 5/2019 | Umezawa | F01N 13/008 |
| 2019/0353075 | A1* | 11/2019 | Brahma | F01N 11/00 |

* cited by examiner

EXHAUST GAS PURIFICATION APPARATUS FOR INTERNAL COMBUSTION ENGINE

CROSS REFERENCE TO RELATED APPLICATION

This application claims the benefit of Japanese Patent Application No. 2018-230021, filed on Dec. 7, 2018, which is hereby incorporated by reference herein in its entirety.

BACKGROUND

Technical Field

The present disclosure relates to an exhaust gas purification apparatus for an internal combustion engine.

Description of the Related Art

There has been known a technology in which in cases where a first catalyst and a second catalyst are arranged in series in an exhaust passage, and in cases where an upstream side air fuel ratio sensor is arranged at the upstream side of the first catalyst, and a downstream side air fuel ratio sensor is arranged at the downstream side of the first catalyst and at the upstream side of the second catalyst, double-sided breakdown control is carried out in which when the air fuel ratio of exhaust gas at the downstream side of the first catalyst becomes different from a stoichiometric air fuel ratio, a target air fuel ratio is inverted between a rich air fuel ratio and a lean air fuel ratio (for example, refer to patent literature 1). In addition, there has been known a technology in which single-sided breakdown control is carried out in which when the air fuel ratio of exhaust gas at the downstream side of a first catalyst becomes a rich air fuel ratio, a target air fuel ratio is switched to a lean air fuel ratio, and thereafter, before the air fuel ratio of this exhaust gas becomes a lean air fuel ratio, the target air fuel ratio is switched to a rich air fuel ratio (for example, refer to the patent literature 1).

CITATION LIST

Patent Literature

Patent Literature 1: Japanese patent application laid-open publication No. 2015-071959

SUMMARY

Technical Problem

In the double-sided breakdown control and the single-sided breakdown control, the air fuel ratio of the exhaust gas flowing out from the first catalyst is detected by the downstream side air fuel ratio sensor, and the target air fuel ratio (which is the air fuel ratio of the exhaust gas flowing into the catalyst and is the air fuel ratio of the exhaust gas flowing out from the internal combustion engine) is changed based on the air fuel ratio of the exhaust gas thus detected. Thus, in cases where the target air fuel ratio is changed based on the air fuel ratio of the exhaust gas detected by the downstream side air fuel ratio sensor, some time is required after the air fuel ratio of the exhaust gas is detected by the downstream side air fuel ratio sensor until the air fuel ratio of the exhaust gas flowing into the first catalyst actually changes. For that reason, in a period of time after the air fuel ratio detected by the downstream side air fuel ratio sensor has changed from the stoichiometric air fuel ratio until the air fuel ratio of the exhaust gas flowing into the first catalyst actually changes, the air fuel ratios of the exhaust gases flowing into the first catalyst and the second catalyst are in a state where they deviate from the stoichiometric air fuel ratio, and hence, there is a fear that in the first catalyst and the second catalyst, oxygen may become insufficient or excessive, and exhaust gas purification performance may decrease. Accordingly, there is a fear that the substances which have not been purified or removed by the first catalyst and the second catalyst may be released into the atmosphere.

The present disclosure has been made in view of the problems as mentioned above, and the object of the present disclosure is to suppress a decrease in purification performance of a system as a whole in cases where catalysts are arranged in an upstream side portion and in a downstream side portion of an exhaust passage in an internal combustion engine.

Solution to Problem

One aspect of the present disclosure resides in an exhaust gas purification apparatus for an internal combustion engine which is provided with: a first catalyst arranged in an exhaust passage of the internal combustion engine, and having an oxygen storage capacity; a second catalyst arranged in the exhaust passage at the downstream side of the first catalyst, and having an oxygen storage capacity; a controller configured to alternately carry out lean control in which a target air fuel ratio of the internal combustion engine is controlled to a lean air fuel ratio larger than a stoichiometric air fuel ratio, and rich control in which the target air fuel ratio of the internal combustion engine is controlled to a rich air fuel ratio smaller than the stoichiometric air fuel ratio; and a sensor configured to detect an air fuel ratio of exhaust gas in the exhaust passage at the downstream side of the first catalyst and at the upstream side of the second catalyst; wherein the controller estimates an amount of increase or decrease of the storage amount of oxygen in the first catalyst, and makes a switch between the lean control and the rich control in such a manner that the amount of increase or decrease in the storage amount of oxygen falls within a predetermined range; and in cases where the rich control is carried out after performing a predetermined number of times of rich control, the controller continues the rich control until the air fuel ratio detected by the sensor becomes equal to or less than a rich determination threshold value smaller than the stoichiometric air fuel ratio, irrespective of the amount of increase or decrease of the storage amount of oxygen thus estimated, and makes a switch from the rich control to the lean control, when the air fuel ratio detected by the sensor becomes equal to or less than the rich determination threshold value.

In cases where the amount of increase or decrease of the storage amount of oxygen in the first catalyst is estimated and the target air fuel ratio of the internal combustion engine is changed between the rich air fuel ratio and the lean air fuel ratio based on this amount of increase or decrease of the storage amount of oxygen, there may be a difference between the target air fuel ratio and an actual air fuel ratio. That is, even if a switch is made between the rich control and the lean control so that the estimated amount of increase or decrease of the storage amount of oxygen falls within the predetermined range, an actual amount of increase or decrease of the storage amount of oxygen may be out of the predetermined range, and in this case, an excess or deficiency may occur in the storage amount of oxygen in the first catalyst. Here, note that the predetermined range is a range of the amount of increase or decrease of the storage amount of oxygen where the purification performance of the first catalyst becomes desired performance.

On the other hand, the controller continues the rich control until the air fuel ratio of the exhaust gas flowing out from the first catalyst becomes equal to or less than the rich determination threshold value in the rich control after the predetermined number of times of rich control have been carried out. Here, note that the rich determination threshold value is an air fuel ratio detected in the case where oxygen has not been stored in the first catalyst, or an air fuel ratio detected in the case where oxygen virtually has not been stored in the first catalyst, and an air fuel ratio smaller than the stoichiometric air fuel ratio. Thus, by continuing the rich control, it is possible to grasp that the storage amount of oxygen in the first catalyst has become substantially zero. For that reason, based on the amount of increase or decrease of the storage amount of oxygen to be estimated after that, it is possible to grasp the actual storage amount of oxygen in the first catalyst in a more accurate manner. In addition, the target air fuel ratio can also be corrected by making a comparison between the target air fuel ratio and the air fuel ratio of the exhaust gas flowing out from the first catalyst. Here, note that the predetermined number of times is decided by taking into consideration a decrease of the storage amount of oxygen in the second catalyst and the accuracy of estimation of the amount of increase or decrease of the storage amount of oxygen in the first catalyst. That is, when the predetermined number of times is small, there is a fear that the exhaust gas of the rich air fuel ratio may frequently flow into the second catalyst, whereby the storage amount of oxygen in the second catalyst may decrease, thus decreasing the purification performance of the second catalyst. On the other hand, when the predetermined number of times is large, an interval at which the storage amount of oxygen in the first catalyst is reset increases, so there is a fear that the estimation accuracy of the storage amount of oxygen may decrease.

Hereinafter, the control of continuing the rich control until the detection value of the sensor becomes equal to or less than the rich determination threshold value is also referred to as rich breakdown control. If the rich breakdown control is carried out each time the rich control is carried out, the exhaust gas of the rich air fuel ratio flows out from the first catalyst each time the rich breakdown control is carried out, thus giving rise to a fear that the storage amount of oxygen in the second catalyst may run short. On the other hand, in cases where the amount of increase or decrease of the storage amount of oxygen in the first catalyst is estimated and the rich control is carried out based on this estimation, the exhaust gas of the rich air fuel ratio is suppressed from flowing out from the first catalyst. Accordingly, by estimating the amount of increase or decrease of the storage amount of oxygen in the first catalyst, and carrying out the rich breakdown control after the predetermined number of times of rich control are performed based on this estimation, it is possible to reduce the number of times in which the exhaust gas of the rich air fuel ratio flows out from the first catalyst. For that reason, the reduction in the storage amount of oxygen in the second catalyst can be suppressed, and hence, the decrease in the exhaust gas purification performance in the second catalyst can be suppressed. That is, it is possible to suppress the decrease in the purification performance of a system as a whole.

In addition, in cases where the lean control is carried out after performing a second predetermined number of times of lean control, the controller can continue the lean control until the air fuel ratio detected by the sensor becomes equal to or more than a lean determination threshold value which is larger than the stoichiometric air fuel ratio, irrespective of the estimated amount of increase or decrease of the storage amount of oxygen, and can make a switch from the lean control to the rich control, when the air fuel ratio detected by the sensor becomes equal to or more than the lean determination threshold value.

The lean determination threshold value is an air fuel ratio detected in the case where oxygen has been saturated in the first catalyst, or an air fuel ratio detected in the case where oxygen has been virtually saturated in the first catalyst, and is an air fuel ratio larger than the stoichiometric air fuel ratio. Hereinafter, the control of continuing the lean control until the detection value of the sensor becomes equal to or more than the lean determination threshold value is also referred to as lean breakdown control. When the rich breakdown control is carried out, there is a fear that the storage amount of oxygen in the second catalyst may decrease, so the removal or oxidation of HC and CO may become difficult. On the other hand, by discharging the exhaust gas of the lean air fuel ratio, too, from the first catalyst by carrying out the lean breakdown control, it is possible to suppress the storage amount of oxygen in the second catalyst from being reduced excessively. Here, note that the second predetermined number of times may be the same as the above-mentioned predetermined number of times, but may be different therefrom. The second predetermined number of times should just be decided so that the storage amount of oxygen in the second catalyst is maintained in a desirable range. In addition, the second predetermined number of times may be decided in consideration of the air fuel ratio in the rich control, the rich determination threshold value, the air fuel ratio in the lean control, the lean determination threshold value, etc.

According to the present disclosure, it is possible to suppress a decrease in purification performance of a system as a whole in cases where catalysts are arranged in an upstream side portion and in a downstream side portion of an exhaust passage in an internal combustion engine.

DESCRIPTION OF EMBODIMENTS

Hereinafter, modes for carrying out the present disclosure will be described in detail by way of example based on preferred embodiments thereof with reference to the attached drawings. However, the dimensions, materials, shapes, relative arrangements and so on of component parts described in the embodiments are not intended to limit the scope of the present disclosure to these alone in particular as long as there are no specific statements.

First Embodiment

Figure 1:
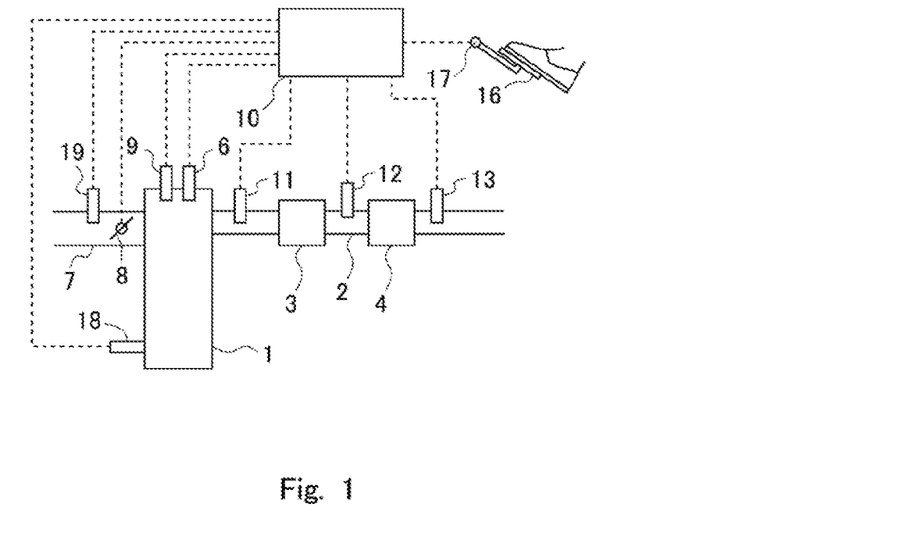
FIG. 1 is a view illustrating the schematic construction of an internal combustion engine as well as its intake and exhaust systems according to embodiments of the present disclosure.

FIG. 1 is a view illustrating the schematic construction of an internal combustion engine 1 as well as its intake and exhaust systems according to a first embodiment of the present disclosure. The internal combustion engine 1 illustrated in FIG. 1 is a gasoline engine. The internal combustion engine 1 is installed on a vehicle, for example. An exhaust passage 2 is connected to the internal combustion engine 1. In the middle of the exhaust passage 2, a first catalyst 3 in the form of a three-way catalyst and a second catalyst 4 also in the form of a three-way catalyst are sequentially arranged in this order from an upstream side.

The first catalyst 3 and the second catalyst 4 serve to purify or remove NOx, HC and CO at the time when a catalytic atmosphere therein is at a stoichiometric air fuel ratio or thereabout. The first catalyst 3 and the second catalyst 4 have oxygen occlusion or storage abilities. That is, they occlude or store oxygen when the air fuel ratio of exhaust gas is a lean air fuel ratio, and release oxygen when the air fuel ratio of exhaust gas is a rich air fuel ratio.

A first air fuel ratio sensor 11 for measuring the air fuel ratio of the exhaust gas is mounted on the exhaust passage 2 at a location upstream of the first catalyst 3. In addition, a second air fuel ratio sensor 12 for detecting the air fuel ratio of the exhaust gas is mounted on the exhaust passage 2 at a location downstream of the first catalyst 3 and upstream of the second catalyst 4. Moreover, a third air fuel ratio sensor 13 for measuring the air fuel ratio of the exhaust gas is mounted on the exhaust passage 2 at a location downstream of the second catalyst 4.

In addition, on the internal combustion engine 1, there is mounted a fuel injection valve 6 for supplying fuel to the internal combustion engine 1. Further, on the internal combustion engine 1, there is mounted a spark plug 9 for generating an electric spark in each cylinder. Moreover, an intake passage 7 is connected to the internal combustion engine 1. A throttle valve 8 for regulating the amount of intake air in the internal combustion engine 1 is arranged in the middle of the intake passage 7. An air flow meter 19 for detecting the amount of intake air in the internal combustion engine 1 is mounted on the intake passage 7 at a location upstream of the throttle valve 8.

In the internal combustion engine 1 constructed as stated above, there is arranged in combination therewith an ECU 10 which is an electronic control unit (controller) for controlling the internal combustion engine 1. The ECU 10 is a computer having a processor, a main storage unit, and an auxiliary storage unit. This ECU 10 controls the internal combustion engine 1 in accordance with the operating conditions of the internal combustion engine 1 and/or driver's requirements. Besides the above-mentioned sensors, an accelerator opening sensor 17, which serves to detect an engine load by outputting an electrical signal corresponding to an amount by which a driver depressed an accelerator pedal 16, and a crank position sensor 18, which serves to detect an engine rotational speed, are connected to the ECU 10 through electrical wiring, and the output signals of these various kinds of sensors are inputted to the ECU 10. On the other hand, the fuel injection valve 6, the throttle valve 8 and the spark plug 9 are connected to the ECU 10 through electrical wiring, so that these parts are controlled by means of the ECU 10. At this time, the processor of the ECU 10 executes a predetermined program on the main storage unit thereof.

The ECU 10 sets a target air fuel ratio of the internal combustion engine 1 based on the operating state of the internal combustion engine 1 (e.g., the engine rotational speed and the accelerator opening degree). Then, the ECU 10 controls the throttle valve 8 and the injection valve 6 in a feedback manner so that a detected value of the first air fuel ratio sensor 11 becomes the target air fuel ratio. In this feedback control, the ECU 10 makes the target air fuel ratio vary between a lean air fuel ratio and a rich air fuel ratio. Here, note that the target air fuel ratio at the time when it is the lean air fuel ratio is referred to as a target lean air fuel ratio, and the target air fuel ratio at the time when it is the rich air fuel ratio is referred to as a target rich air fuel ratio. The target lean air fuel ratio is an air fuel ratio (e.g., 14.65) which is larger than the stoichiometric air fuel ratio (e.g., 14.6), and the target rich air fuel ratio is an air fuel ratio (e.g., 14.55) which is smaller than the stoichiometric air fuel ratio. Air fuel ratio control in which the target air fuel ratio is set to the target lean air fuel ratio is hereinafter referred to as lean control, and air fuel ratio control in which the target air fuel ratio is set to the target rich air fuel ratio is hereinafter referred to as rich control.

The ECU 10 switches the target air fuel ratio between the target rich air fuel ratio and the target lean air fuel ratio in an alternate manner based on the amount of increase or decrease OSA of the storage amount of oxygen in the first catalyst 3. For that reason, the ECU 10 estimates the amount of increase or decrease OSA of the storage amount of oxygen in the first catalyst 3. The amount of increase or decrease OSA of the storage amount of oxygen in the first catalyst 3 can be estimated based on the amount of intake air detected by the air flow meter 19, and the air fuel ratio of the exhaust gas flowing into the first catalyst 3. In each of the rich control and the lean control, the amount of increase or decrease OSA of the storage amount of oxygen is calculated by integrating an instantaneous value of the amount of increase or decrease OSA of the storage amount of oxygen. For example, at the time of the lean control, the amount of increase or decrease OSA of the storage amount of oxygen becomes a positive value, whereas at the time of the rich control, the amount of increase or decrease OSA of the storage amount of oxygen becomes a negative value. That is, in cases where the amount of increase or decrease OSA of the storage amount of oxygen is a positive value, the value indicates an amount of oxygen which has increased in the first catalyst 3. On the other hand, in cases where the amount of increase or decrease OSA of the storage amount of oxygen is a negative value, the absolute value of the negative value indicates an amount of oxygen which has decreased in the first catalyst 3. The instantaneous value of the amount of increase or decrease OSA of the storage amount of oxygen is calculated by the following expression.

$$OSA = (\text{actual } A/F - \text{theoretical } A/F) \times \text{amount of fuel injection} \times \text{oxygen concentration of air},$$

where actual A/F is the detected value of the first air fuel ratio sensor 11, theoretical A/F is the stoichiometric air fuel ratio (e.g., 14.6), and amount of fuel injection is an amount of fuel injected per unit time from the injection valve 6. By integrating this amount of increase or decrease OSA of the storage amount of oxygen, the amount of increase of the storage amount of oxygen is calculated at the time of the lean control, whereas the amount of decrease of the storage amount of oxygen is calculated at the time of the rich control.

When the amount of increase or decrease OSA of the storage amount of oxygen in the first catalyst 3 becomes equal to or more than an upper limit threshold value while carrying out the lean control, the ECU 10 switches from the lean control to the rich control. In addition, when the amount of increase or decrease OSA of the storage amount of oxygen in the first catalyst 3 becomes equal to or less than a lower limit threshold value while carrying out the rich control, the ECU 10 switches from the rich control to the lean control. Here, note that in this embodiment, a switch is made between the rich control and the lean control based on the amount of increase or decrease OSA of the storage amount of oxygen, but instead of this, the switch between the rich control and the lean control may be made based on the storage amount of oxygen itself. The lower limit threshold value is an example of a lower limit value of the predetermined range, and the upper limit threshold value is an example of an upper limit value of the predetermined range.

The upper limit threshold value is set so as to suppress NOx from flowing out from the first catalyst 3 during the lean control. That is, when the storage amount of oxygen in the first catalyst 3 becomes too large during the lean control, it becomes difficult to remove or reduce NOx, so the upper limit threshold value is set in such a manner that the lean control is switched to the rich control before the storage amount of oxygen in the first catalyst 3 becomes too large. Here, note that the upper limit threshold value may also be set in such a manner that the concentration of NOx flowing out from the first catalyst 3 falls within an allowable range. This upper limit threshold value may have been obtained in advance through experiments, simulations, or the like. The upper limit threshold value is a value which is smaller than a maximum oxygen storage amount OSC which is a maximum value of the storage amount of oxygen in the first catalyst 3, and for example, it may be set to 50% of the maximum oxygen storage amount OSC.

On the other hand, the lower limit threshold value is set so as to suppress HC and CO from flowing out from the first catalyst 3 during the rich control. That is, when the storage amount of oxygen in the first catalyst 3 becomes too small during the rich control, it becomes difficult to remove or oxidize HC and CO, so the lower limit threshold value is set in such a manner that the rich control is switched to the lean control before the storage amount of oxygen in the first catalyst 3 becomes too small. Here, note that the lower limit threshold value may also be set in such a manner that the amounts or concentrations of HC and CO flowing out from the first catalyst 3 fall within allowable ranges, respectively. The lower limit threshold value may have been obtained in advance through experiments, simulations, or the like. The lower limit threshold value may be set so that the absolute value thereof becomes 50% of the maximum oxygen storage amount.

In cases where the rich control and the lean control are carried out in an alternate manner as mentioned above, the air fuel ratio of the exhaust gas flowing out from the first catalyst 3 becomes the stoichiometric air fuel ratio. However, a deviation in the air fuel ratio of the internal combustion engine 1 may be caused by disturbances, etc. For example, in cases where the actual air fuel ratio has deviated to the lean side from the target air fuel ratio, even if the rich control is being carried out, the actual air fuel ratio of the exhaust gas flowing into the first catalyst 3 may become a lean air fuel ratio. In this case, the actual amount of increase or decrease of the storage amount of oxygen in the first catalyst 3 may exceed the upper limit threshold value, thus giving rise to a fear that oxygen may be saturated in the first catalyst 3. For that reason, it may become impossible to purify (remove or reduce) NOx in the first catalyst 3 to a sufficient extent.

Figure 2:
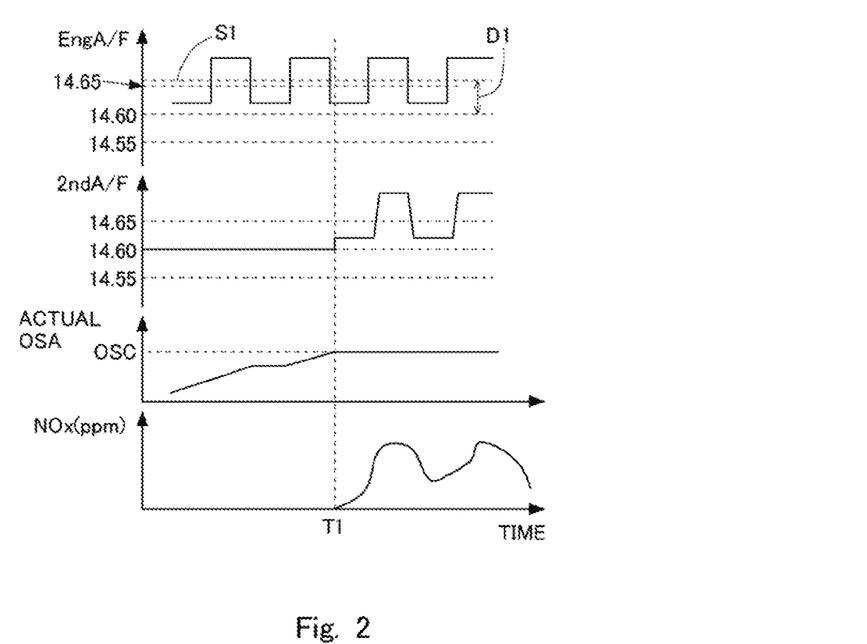
FIG. 2 is a time chart illustrating the changes over time of an actual air fuel ratio (EngA/F) in the internal combustion engine, an air fuel ratio (2ndA/F) detected by a second air fuel ratio sensor, an actual amount of increase or decrease (actual OSA) of an storage amount of oxygen in a first catalyst, and a concentration of NOx in an exhaust gas flowing out from the first catalyst, when the air fuel ratio deviates to a lean side in cases where rich control and lean control are carried out in an alternate manner.

FIG. 2 is a time chart illustrating the changes over time of the actual air fuel ratio (EngA/F) in the internal combustion engine 1, the air fuel ratio (2ndA/F) detected by the second air fuel ratio sensor 12, the actual amount of increase or decrease (actual OSA) of the storage amount of oxygen in the first catalyst 3, and the concentration of NOx in the exhaust gas flowing out from the first catalyst 3, when the air fuel ratio has deviated to the lean side in cases where the rich control and the lean control are carried out in an alternate manner. In EngA/F of FIG. 2, the mean value of the air fuel ratio is a value indicated by S1 which deviates by D1 from the stoichiometric air fuel ratio (e.g. 14.60). For this reason, even when the rich control is carried out, EngA/F is larger than the stoichiometric air fuel ratio (e.g., 14.60), and has actually not become a rich air fuel ratio. For that reason, the air fuel ratio of the exhaust gas actually flowing into the first catalyst 3 varies in a lean air fuel ratio range, and the exhaust gas of a lean air fuel ratio always flows into the first catalyst 3. In that case, the actual OSA continues to increase without decreasing, and at a time point indicated by T1, the actual OSA reaches the maximum oxygen storage amount OSC. That is, after the time point T1, the occlusion or storage of oxygen in the first catalyst 3 becomes difficult, and the air fuel ratio of the exhaust gas in the first catalyst 3 becomes a lean air fuel ratio. In a period of time after this time point T1, 2ndA/F becomes a value corresponding to EngA/F. In addition, in the period of time after T1, the removal or reduction of NOx in the first catalyst 3 becomes difficult, and so NOx flows out from the first catalyst 3.

Figure 3:
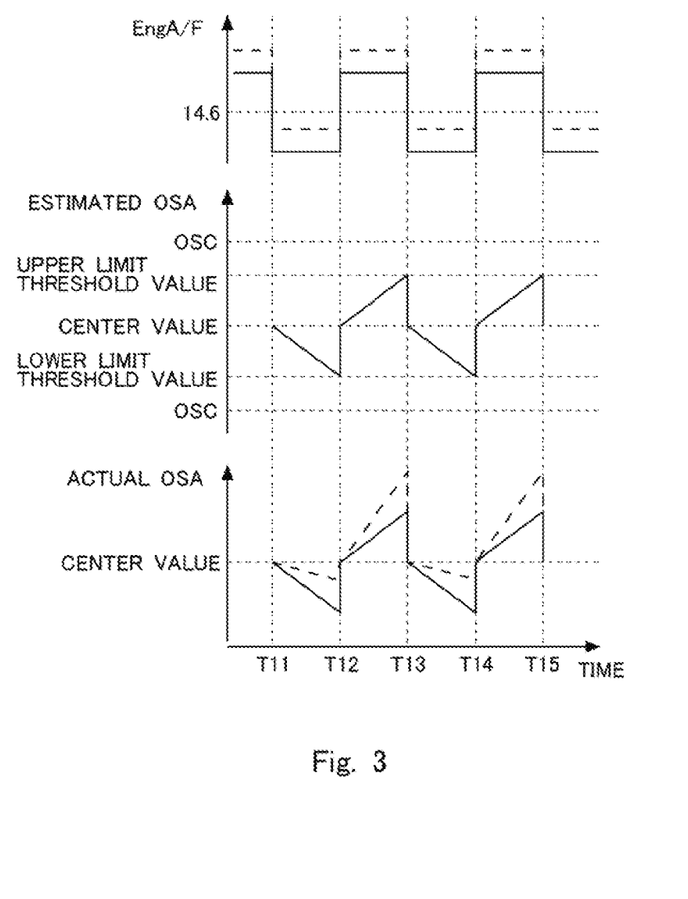
FIG. 3 is a time chart illustrating the changes over time of the air fuel ratio (EngA/F), an estimated OSA and the actual OSA in the internal combustion engine in the case of carrying out the rich control and the lean control in an alternate manner.

In addition, when EngA/F at the time of carrying out the rich control has deviated to a side at which the air fuel ratio becomes larger though not deviate to a lean air fuel ratio, as illustrated FIG. 2, the storage amount of oxygen in the first catalyst 3 will gradually decrease. FIG. 3 is a time chart illustrating the changes over time of the air fuel ratio EngA/F, the estimated OSA and the actual OSA in the case of carrying out the rich control and the lean control in an alternate manner. In FIG. 3, solid lines indicate a case where the actual air fuel ratio of the exhaust gas flowing into the first catalyst 3 coincides with the target air fuel ratio, and broken lines indicate a case where the actual air fuel ratio of the exhaust gas flowing into the first catalyst 3 has deviated to the lean side from the target air fuel ratio. Here, note that, even in the case indicated by the broken lines, EngA/F at the time of the rich control is smaller than the stoichiometric air fuel ratio (e.g., 14.60). In a period of time from T11 to T12 and in a period of time from T13 to T14, the rich control is carried out, and in a period of time from T12 to T13 and in a period of time from T14 to T15, the lean control is carried out. The estimated OSA indicates the amount of increase or decrease of the storage amount of oxygen in the first catalyst 3 estimated by the ECU 10, and the actual OSA indicates the actual amount of increase or decrease of the storage amount of oxygen in the first catalyst 3.

In cases where the ECU 10 can not recognize that the air fuel ratio has deviated even if the actual air fuel ratio of the exhaust gas flowing into the first catalyst 3 deviates to the lean side from the target air fuel ratio, the solid line and the broken line in the estimated OSA coincide with each other. On the other hand, in the actual OSA, in the case where the actual EngA/F has deviated to the lean side from the target air fuel ratio (in the case of the broken line), at the time of the rich control, the decrease of the oxygen concentration is smaller and hence the amount of decrease of the actual OSA per unit time also becomes smaller, as compared with the case where the actual EngA/F has not deviated (in the case of the solid line). In contrast, at the time of the lean control, the increase of the oxygen concentration is larger, so the amount of increase of the actual OSA per unit time becomes larger. When the rich control and the lean control are switched from one to the other based on the estimated OSA in the case where the actual OSA is larger than the estimated OSA, there is a fear that the storage amount of oxygen in the first catalyst 3 may increase to an excessive extent.

Accordingly, the ECU 10 does not switch the rich control to the lean control until the detected value of the second air fuel ratio sensor 12 becomes equal to or less than a rich determination threshold value, in one of a plurality of executions of the rich control. Thus, the control of continuing the rich control until the detection value of the second air fuel ratio sensor 12 becomes equal to or less than the rich determination threshold value is hereinafter referred to as rich breakdown control. In addition, the rich control at the time when the rich breakdown control is not carried out is hereinafter referred to as normal rich control. Here, note that in the case where the rich breakdown control is carried out, the target rich air fuel ratio may be made smaller than in the case where the normal rich control is carried out. In this case, the target rich air fuel ratio at the time of the rich breakdown control may be set to a sufficiently small air fuel ratio so that even if the actual air fuel ratio in the internal combustion engine 1 has deviated from the target air fuel ratio, the actual air fuel ratio becomes a rich air fuel ratio.

By carrying out the rich breakdown control, the storage amount of oxygen in the first catalyst 3 becomes substantially zero, so that the estimated value of the storage amount of oxygen can be reset. By carrying out the lean control from this state, it is possible to suppress the storage amount of oxygen from increasing to an excessive extent. In addition, the detected value of the first air fuel ratio sensor 11 or the target air fuel ratio can also be corrected based on the air fuel ratio detected by the second air fuel ratio sensor 12 at this time.

Figure 4:
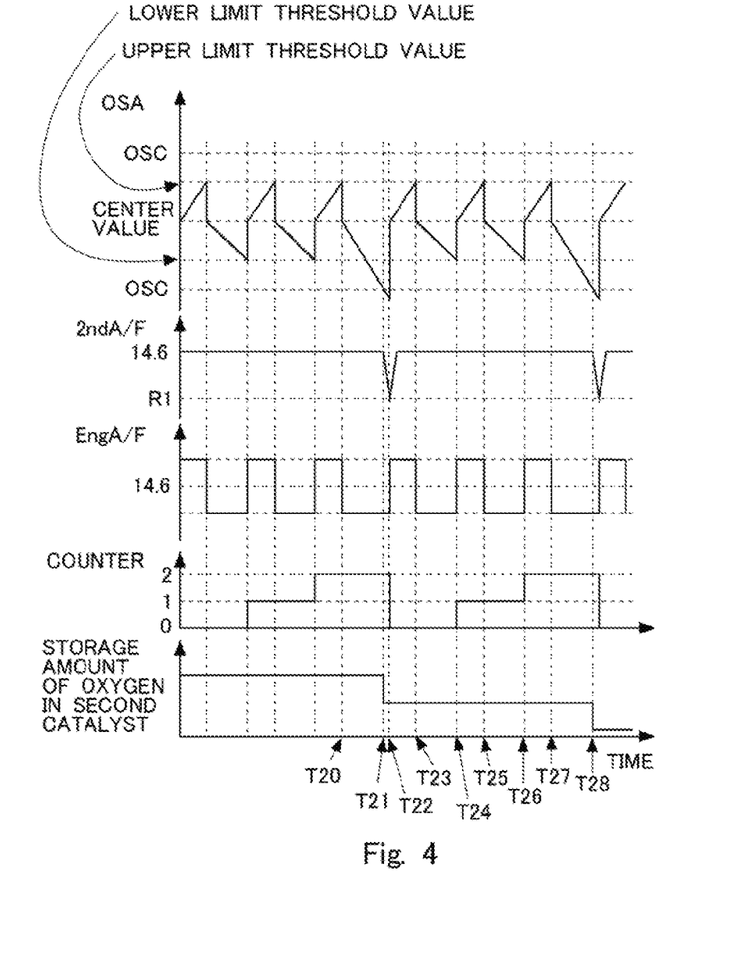
FIG. 4 is a time chart illustrating the changes over time of the OSA, the 2ndA/F, the EngA/F, a counter and a second catalyst oxygen storage amount at the time of carrying out rich breakdown control.

FIG. 4 is a time chart illustrating the changes over time of the OSA, the 2ndA/F, the EngA/F, a counter and a second catalyst oxygen storage amount at the time of carrying out rich breakdown control. The OSA in FIG. 4 is an OSA estimated by the ECU 10. The counter in FIG. 4 is a counter which counts the number of switches from the rich control to the lean control, and which is reset at the time of the termination of the rich breakdown control. The second catalyst oxygen storage amount represents the storage amount of oxygen in the second catalyst 4. In FIG. 4, at time point T20, the counter is 2. When the counter becomes 2, the ECU 10 carries out the rich breakdown control at the time of the next rich control. That is, after carrying out the normal rich control two times, the rich breakdown control is carried out. The two times are an example of a predetermined number of executions. Here, note that FIG. 4 illustrates a case where there is no deviation between the EngA/F and the target air fuel ratio.

For example, at T20, the OSA reaches the upper limit threshold value, so the lean control is switched to the rich control, but the counter is 2 at this time, so the rich breakdown control is carried out from T20. In the rich breakdown control, even if the OSA becomes equal to or more than the lower limit threshold value, the EngA/F is kept at the rich air fuel ratio. Then, when the magnitude of the absolute value of the OSA exceeds the maximum oxygen storage amount OSC at T21, the oxygen in the first catalyst 3 will be in an insufficient state, and the detected value of the 2ndA/F will change from the stoichiometric air fuel ratio to the rich air fuel ratio. Then, when the 2ndA/F becomes equal to or less than the rich determination threshold value R1 at T22, the ECU 10 terminates the rich breakdown control. As a result, the counter is reset to 0. From time T22, the lean control is carried out. Here, the air fuel ratio of the exhaust gas flowing out from the first catalyst 3 becomes substantially the stoichiometric air fuel ratio, except when carrying out the rich breakdown control. The storage amount of oxygen in the second catalyst 4 does not substantially change while the exhaust gas of substantially the stoichiometric air fuel ratio is flowing into the second catalyst 4. On the other hand, when the rich breakdown control is carried out, the air fuel ratio of the exhaust gas flowing into the second catalyst 4 becomes the rich air fuel ratio, so the oxygen stored in the second catalyst 4 is consumed. For that reason, the storage amount of oxygen in the second catalyst 4 decreases each time the rich breakdown control is carried out.

In a period of time from time T21 to T23, the lean control is carried out. At T23, the OSA becomes equal to or more than the upper limit threshold value, so the lean control is switched to the rich control. In a period of time from time T23 to T24, the rich control is carried out. At T24, the OSA becomes equal to or less than the lower limit threshold value, so the rich control is switched to the lean control. When the rich control is terminated at T24, 1 is added to the counter. Similarly, when the lean control is switched to the rich control at T27 while the lean control and the rich control are carried out in an alternate manner, the rich breakdown control is carried out because the counter is 2.

Figure 5:
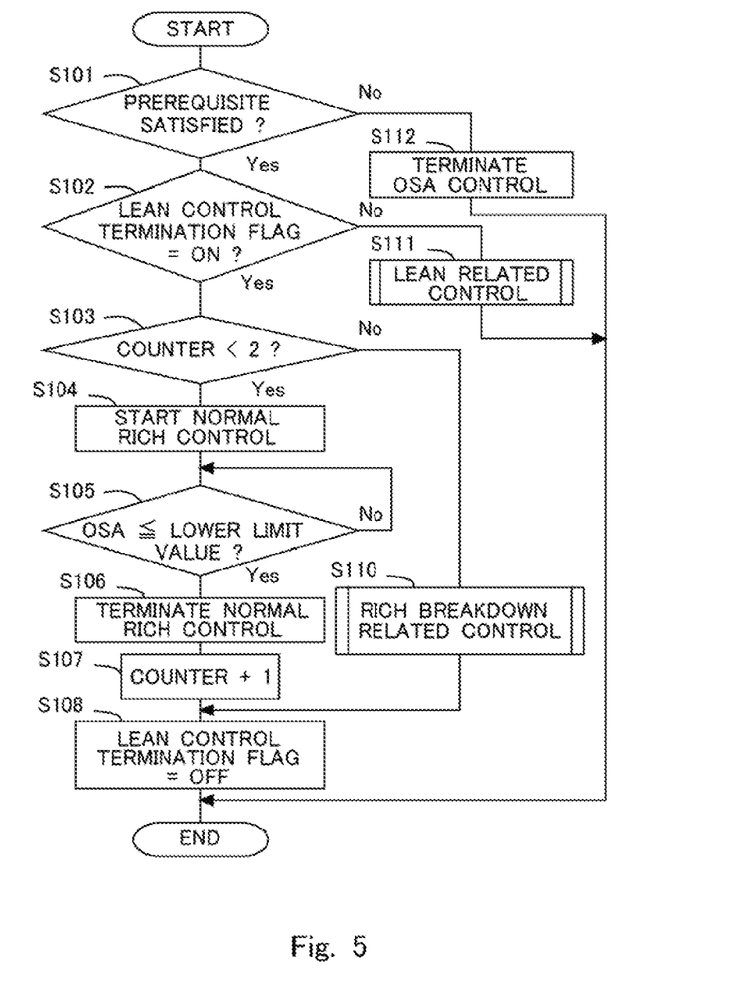
FIG. 5 is a flow chart illustrating a flow of OSA control according to a first embodiment and a second embodiment.

FIG. 5 is a flow chart illustrating a flow or routine for OSA control according to this embodiment. The routine in this flow chart is carried out by means of the ECU 10 at each predetermined time interval.

In step S101, it is determined based on the amount of increase or decrease OSA of the storage amount of oxygen in the first catalyst 3 whether a prerequisite for carrying out the control (hereinafter also referred to as OSA control) in which the target air fuel ratio is switched between the target rich air fuel ratio and the target lean air fuel ratio in an alternate manner is satisfied. For example, the prerequisite is that the internal combustion engine 1 is operated under a predetermined operating condition, and that both the first catalyst 3 and the second catalyst 4 are activated, etc. In cases where an affirmative determination is made in step S101, the routine goes to step S102. On the other hand, in cases where a negative determination is made in step S101, the routine goes to step S112, where the OSA control is terminated.

In step S102, it is determined whether a lean control termination flag is ON. The lean control termination flag is a flag that is set to ON when the lean control is terminated. The lean control termination flag is OFF in an initial state. In cases where an affirmative determination is made in step S102, the routine goes to step S103, whereas in cases where a negative determination is made, the routine goes to step S111. Here, note that lean related control to be carried out in step S111 will be described later.

In step S103, it is determined whether the counter (count) is smaller than 2. This counter is the counter explained in FIG. 4. In this step S103, it is determined whether the number of times of carrying out the normal rich control is less than 2. In cases where an affirmative determination is made in step S103, the routine goes to step S104, whereas in cases where a negative determination is made, the routine goes to step S110. Here, note that rich breakdown related control to be carried out in step S110 will be described later.

In step S104, the normal rich control is started. That is, the target air fuel ratio in the internal combustion engine 1 is set to the target rich air fuel ratio. In that case, the ECU 10 adjusts the amount of fuel injection or the amount of intake air so that the air fuel ratio in the internal combustion engine 1 becomes the target rich air fuel ratio. When the processing of step S104 ends, the routine goes to step S105. In step S105, it is determined whether the OSA is equal to or less than the lower limit threshold value. In this step S105, it is determined whether it is the time when the rich control is switched to the lean control. In cases where an affirmative determination is made in step S105, the routine goes to step S106, whereas in cases where a negative determination is made, the processing of the step S105 is carried out again.

In step S106, the normal rich control is terminated. Then, in step S107, 1 is added to the counter, and the routine goes to step S108. In the step S108, the lean control termination flag is set to OFF. When the processing of the step S108 is ended, this routine is ended.

Figure 6:
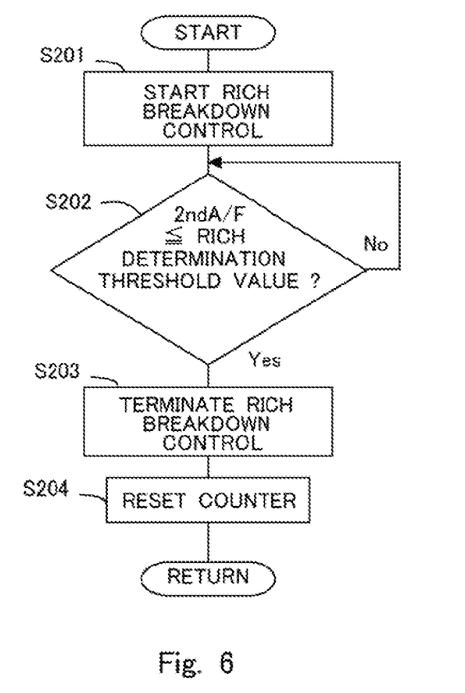
FIG. 6 is a flow chart illustrating a flow of rich breakdown related control according to the first and the second embodiments.

Next, the rich breakdown related control to be carried out by the ECU 10 in the step S110 will be explained. FIG. 6 is a flow chart illustrating a flow or routine for the rich breakdown related control according to this embodiment. In the rich breakdown related control, the rich breakdown control and its related control are carried out. In step S201, the rich breakdown control is started. The ECU 10 adjusts the amount of fuel injection or the amount of intake air so that the air fuel ratio in the internal combustion engine 1 becomes the target rich air fuel ratio. The target rich air fuel ratio at this time may be an air fuel ratio which is smaller than that at the time of the normal rich control.

In step S202, it is determined whether the detected value (2ndA/F) of the second air fuel sensor 12 is equal to or less than the rich determination threshold value. In this step S202, it is determined whether the consumption of the oxygen stored in the first catalyst 3 has been completed. In the rich breakdown control, the rich control is switched to the lean control based on the detected value of the second air fuel ratio sensor 12, instead of OSA. In cases where an affirmative determination is made in step S202, the routine goes to step S203, whereas in cases where a negative determination is made, the processing of the step S202 is carried out again.

In the step S203, the rich breakdown control is terminated. Thereafter, in step S204, when the counter is reset, this routine in FIG. 6 is ended, and the routine in FIG. 5 goes to step S108.

Figure 7:
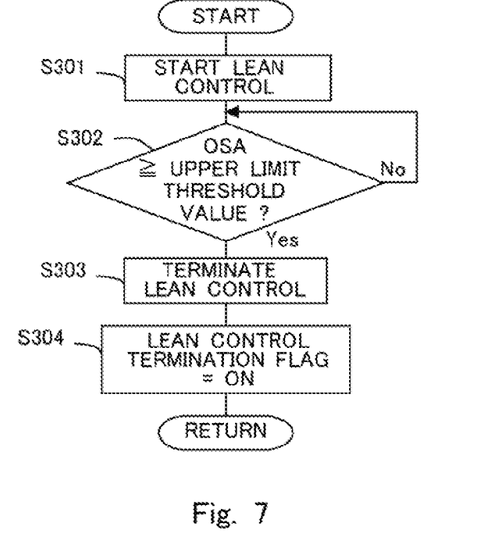
FIG. 7 is a flow chart illustrating a flow of lean related control according to the first embodiment.

Now, the lean related control to be carried out by the ECU 10 in the step S111 will be explained. FIG. 7 is a flow chart illustrating a flow or routine for the lean related control according to this embodiment. In the lean related control, the lean control and its related control are carried out. In step S301, the lean control is started. The ECU 10 adjusts the amount of fuel injection or the amount of intake air so that the air fuel ratio in the internal combustion engine 1 becomes the target lean air fuel ratio.

In step S302, it is determined whether the OSA is equal to or more than the upper limit threshold value. In this step S302, it is determined whether it is the time when the lean control is switched to the rich control. In cases where an affirmative determination is made in the step S302, the routine goes to step S303, whereas in cases where a negative determination is made, the processing of the step S302 is carried out again.

In the step S303, the lean control is terminated. Thereafter, in step S304, the lean control termination flag is set to ON. When the processing of the step S304 is terminated, this routine in FIG. 7 is ended, returning to FIG. 5, and the routine of FIG. 5 is ended.

As described above, according to this embodiment, the storage amount of oxygen in the first catalyst 3 can be reset, by carrying out the rich breakdown control once in a plurality of times of rich control. With this, it is possible to suppress the occurrence of an excess or deficiency in the storage amount of oxygen in the first catalyst 3. In addition, the rich breakdown control is not carried out each time the rich control is carried out, but is carried out once after carrying out the rich control a predetermined number of times, and hence, a period of time in which the air fuel ratio of the exhaust gas flowing into the second catalyst 4 becomes the rich air fuel ratio is short. For that reason, it is possible to suppress a shortage of oxygen in the second catalyst 4. Accordingly, it is possible to suppress a decrease in the purification performance of the system as a whole.

Second Embodiment

In a second embodiment according to the present disclosure, lean breakdown control is also carried out, in addition to the rich breakdown control. The lean breakdown control is that the lean control is continued until the detection value of the second air fuel ratio sensor 12 becomes equal to or more than a lean determination threshold value. Here, note that the lean control at the time when the lean breakdown control is not carried out is hereinafter referred to as normal lean control. In the case where the lean breakdown control is carried out, the target lean air fuel ratio may be made larger than in the case where the normal lean control is carried out. In this case, the target lean air fuel ratio at the time of the lean breakdown control may be set to a sufficiently large air fuel ratio so that even if the actual air fuel ratio in the internal combustion engine 1 has deviated from the target air fuel ratio, the actual air fuel ratio becomes a lean air fuel ratio.

Here, as illustrated in FIG. 4, the storage amount of oxygen in the second catalyst 4 does not substantially change while the exhaust gas of substantially the stoichiometric air fuel ratio is flowing into the second catalyst 4. However, when the rich breakdown control is carried out, the air fuel ratio of the exhaust gas flowing into the second catalyst 4 becomes the rich air fuel ratio, so the oxygen stored in the second catalyst 4 is consumed. For that reason, the storage amount of oxygen in the second catalyst 4 decreases each time the rich breakdown control is carried out. In that case, the storage amount of oxygen in the second catalyst 4 may become zero, thus giving rise to a fear that the purification (oxidation) rate of HC, CO in the system as a whole may decrease.

Figure 8:
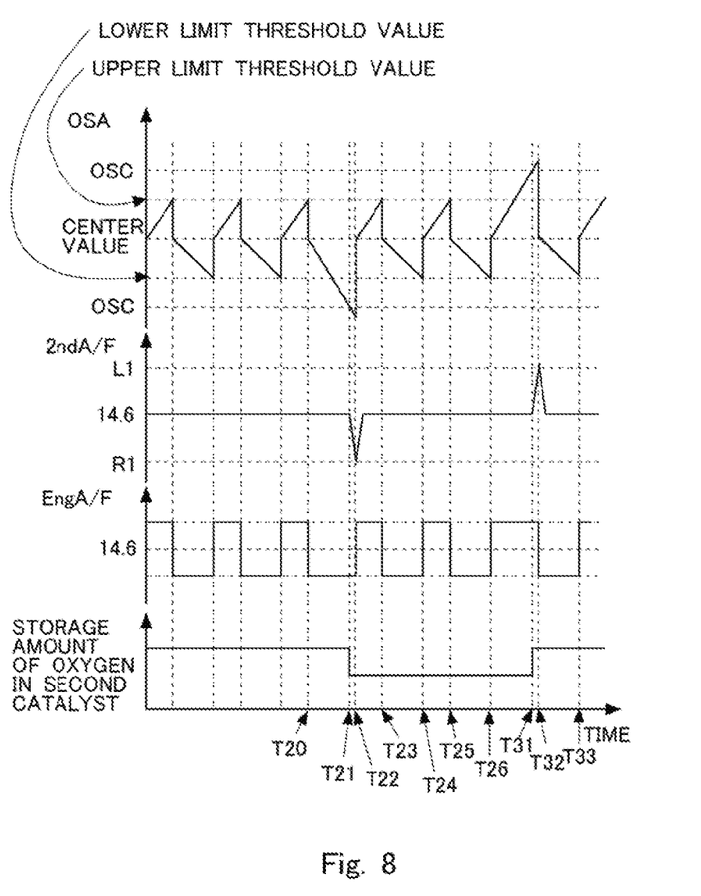
FIG. 8 is a time chart illustrating the changes over time of the OSA, the 2ndA/F, the EngA/F, and the second catalyst oxygen storage amount at the time of carrying out rich breakdown control and lean breakdown control.

On the other hand, oxygen can be supplied to the second catalyst 4 at the time of the lean breakdown control, by carrying out the lean breakdown control in addition to the rich breakdown control. FIG. 8 is a time chart illustrating the changes over time of the OSA, the 2ndA/F, the EngA/F, and the second catalyst oxygen storage amount at the time of carrying out the rich breakdown control and the lean breakdown control. Here, note that FIG. 8 illustrates a case where there is no deviation between the EngA/F and the target air fuel ratio. The changes over time of these components until T26 in FIG. 8 are the same as those in FIG. 4, so the explanation thereof is omitted. In FIG. 8, after carrying out the lean breakdown control, the normal rich control is carried out twice, and after that, the rich breakdown control is further carried out. On the other hand, in FIG. 8, after carrying out the rich breakdown control, the normal lean control is carried out twice, and after that, the lean breakdown control is further carried out. The twice is an example of a second predetermined number of executions.

At T26, the OSA becomes equal to or less than the lower limit threshold value, so the rich control is switched to the lean control, but from T22, which is the time point of termination of the rich breakdown control, the normal lean control is carried out twice, so the lean control carried out from T26 becomes the lean breakdown control. For that reason, the lean breakdown control is continuously carried out until the 2ndA/F becomes equal to or more than a lean determination threshold value L1 at T32. At T31 in the middle of carrying out the lean breakdown control, the OSA becomes equal to or more than the maximum oxygen storage amount OSC, and the air fuel ratio of the exhaust gas flowing out from the first catalyst 3 becomes the lean air fuel ratio. Then, when the air fuel ratio of the exhaust gas flowing into the second catalyst 4 becomes the lean air fuel ratio, the storage amount of oxygen in the second catalyst 4 increases.

Figure 9:
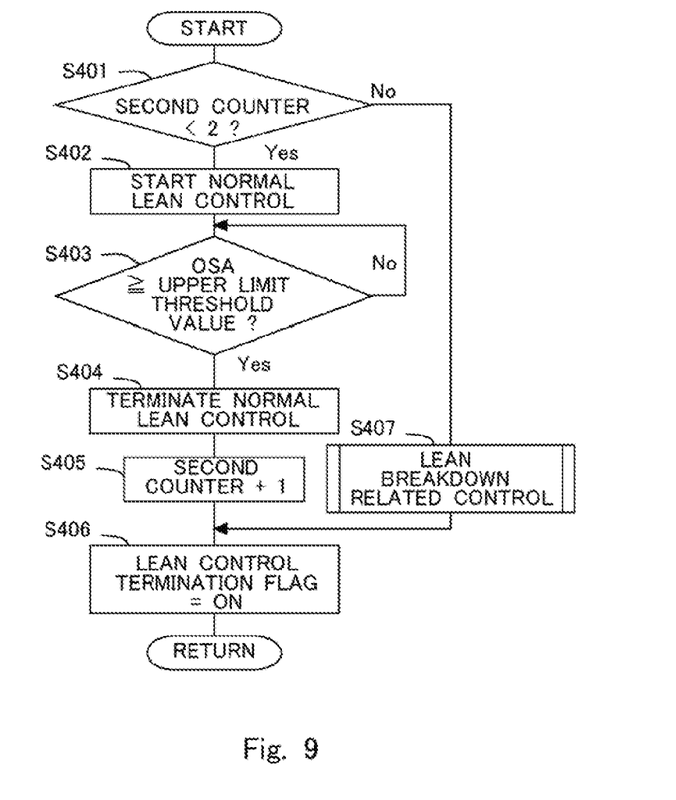
FIG. 9 is a flow chart illustrating a flow of lean related control according to the second embodiment.

Next, reference will be made to a flow or routine of OSA control according to this second embodiment. The OSA control according to this second embodiment is different from that of the first embodiment in the lean related control of step S111 in the flow chart of FIG. 5. FIG. 9 is a flow chart illustrating a flow or routine for lean related control according to this second embodiment. This flow or routine in the flow chart of FIG. 9 is carried out in step S111 in FIG. 5.

In step S401 in FIG. 9, it is determined whether a second counter (count) is smaller than 2. This second counter is a counter which counts the number of switches from the lean control to the rich control, and which is reset at the time of the termination of the lean breakdown control. That is, the second counter is a counter which counts the number of times in which the normal lean control has been carried out. In this step S401, it is determined whether the number of times of carrying out the normal lean control is less than 2. In cases where an affirmative determination is made in step S401, the routine goes to step S402, whereas in cases where a negative determination is made, the routine goes to step S407. Here, note that lean breakdown related control to be carried out in step S407 will be described later.

In the step S402, the normal lean control is started. That is, the target air fuel ratio in the internal combustion engine 1 is set to the target lean air fuel ratio. In that case, the ECU 10 adjusts the amount of fuel injection or the amount of intake air so that the air fuel ratio in the internal combustion engine 1 becomes the target lean air fuel ratio. When the processing of the step S402 ends, the routine goes to step S403. In the step S403, it is determined whether the OSA is equal to or more than the upper limit threshold value. In this step S403, it is determined whether it is the time when the lean control is switched to the rich control. In cases where an affirmative determination is made in the step S403, the routine goes to step S404, whereas in cases where a negative determination is made, the processing of the step S403 is carried out again.

In the step S404, the normal lean control is terminated. After that, in step S405, 1 is added to the second counter, and the routine goes to step S406. In the step S406, the lean control termination flag is set to ON. When the processing of the step S406 is terminated, a return is made to FIG. 5, and the routine illustrated in FIG. 5 is ended.

Figure 10:
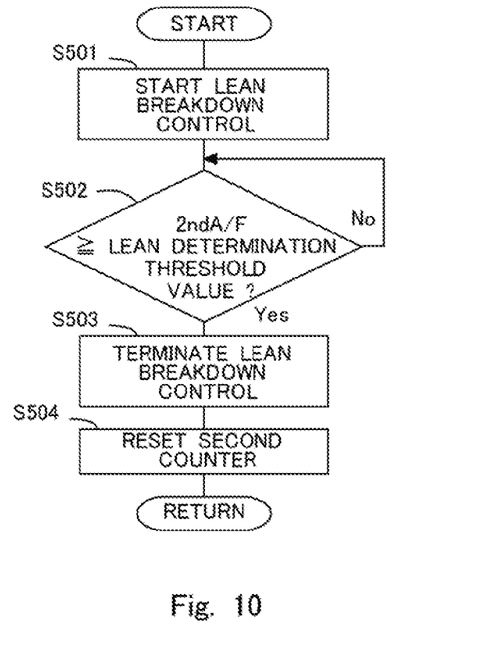
FIG. 10 is a flow chart illustrating a flow of lean breakdown related control according to the second embodiment.

Now, the lean breakdown related control to be carried out by the ECU 10 in the step S407 will be explained. FIG. 10 is a flow chart illustrating a flow or routine for the lean breakdown related control according to this second embodiment. In the lean breakdown related control, the lean breakdown control and its related control are carried out. In step S501, the lean breakdown control is started. The ECU 10 adjusts the amount of fuel injection or the amount of intake air so that the air fuel ratio in the internal combustion engine 1 becomes the target lean air fuel ratio. The target lean air fuel ratio at this time may be an air fuel ratio which is larger than that at the time of the normal lean control.

In step S502, it is determined whether the detected value (2ndA/F) of the second air fuel sensor 12 is equal to or more than the lean determination threshold value. In this step S502, it is determined whether the occlusion or storage of oxygen into the first catalyst 3 has been completed. In cases where an affirmative determination is made in step S502, the routine goes to step S503, whereas in cases where a negative determination is made, the processing of the step S502 is carried out again.

In the step S503, the lean breakdown control is terminated. Thereafter, in step S504, when the second counter is reset, this routine in FIG. 10 is ended, and the routine in FIG. 9 goes to step S406.

As described above, according to this second embodiment, by carrying out the rich breakdown control once in a plurality of times of rich control, and by carrying out the lean breakdown control once in a plurality of times of lean control, it is possible to maintain the storage amount of oxygen in the second catalyst 4 in a suitable range, and hence, it is possible to suppress a decrease in the exhaust gas purification performance in the second catalyst 4.

Other Embodiments

In the above-mentioned first and second embodiments, the rich breakdown control is carried out once in three times of rich control, but it is not limited to this, and at least one time of rich breakdown control should just be included while carrying out a plurality of times of rich control. This at least one time means a number of times smaller than the plurality of times in which the rich control is carried out. For example, the rich breakdown control may be carried out two times while the rich control is carried out five times. Similarly, with respect to the lean breakdown control, at least one time of lean breakdown control should just be included while carrying out a plurality of times of lean control.

In addition, in the above-mentioned second embodiment, the rich breakdown control and the lean breakdown control are carried out in an alternate manner. That is, after the rich breakdown control is carried out, the lean breakdown control is carried out before the following rich breakdown control is carried out. However, either the rich breakdown control or the lean breakdown control may be carried out continuously. For example, after carrying out the rich breakdown control two or more times, the lean breakdown control may be carried out. Also, after carrying out the lean breakdown control two or more times, the rich breakdown control may be carried out. In these cases, the target rich air fuel ratio and the rich determination threshold value at the time of the rich breakdown control, and the target lean air fuel ratio and the lean determination threshold value at the time of the lean breakdown control may be decided so that the storage amount of oxygen in the second catalyst 4 falls in a desirable range. The storage amount of oxygen in the second catalyst 4 can be calculated based on the flow rate of the exhaust gas and the detected value of the second air fuel ratio sensor 12, for example. Thus, when carrying out the rich breakdown control and the lean breakdown control so that the storage amount of oxygen in the second catalyst 4 falls in the desirable range, it is possible to suppress a decrease in the exhaust gas purification performance in the second catalyst 4, and hence, it is also possible to suppress a decrease in the purification performance in the system as a whole.

What is claimed is:

1. An exhaust gas purification apparatus for an internal combustion engine which includes:
   a first catalyst arranged in an exhaust passage of the internal combustion engine, and having an oxygen storage capacity;
   a second catalyst arranged in the exhaust passage at the downstream side of the first catalyst, and having an oxygen storage capacity;
   a controller configured to alternately carry out lean control in which a target air fuel ratio of the internal combustion engine is controlled to a lean air fuel ratio larger than a stoichiometric air fuel ratio, and rich control in which the target air fuel ratio of the internal combustion engine is controlled to a rich air fuel ratio smaller than the stoichiometric air fuel ratio; and
   a sensor configured to detect an air fuel ratio of exhaust gas in the exhaust passage at the downstream side of the first catalyst and at the upstream side of the second catalyst;
   wherein the controller estimates an amount of increase or decrease of the storage amount of oxygen in the first catalyst, and makes a switch between the lean control and the rich control in such a manner that the amount of increase or decrease in the storage amount of oxygen falls within a predetermined range; and
   in cases where the rich control is carried out after performing a predetermined number of times of rich control, the controller continues the rich control until the air fuel ratio detected by the sensor becomes equal to or less than a rich determination threshold value smaller than the stoichiometric air fuel ratio, irrespective of the amount of increase or decrease of the storage amount of oxygen thus estimated, and makes a switch from the rich control to the lean control, when the air fuel ratio detected by the sensor becomes equal to or less than the rich determination threshold value.

2. The exhaust gas purification apparatus for an internal combustion engine as set forth in claim 1, wherein
   in cases where the lean control is carried out after performing a second predetermined number of times of lean control, the controller continues the lean control until the air fuel ratio detected by the sensor becomes equal to or more than a lean determination threshold value which is larger than the stoichiometric air fuel ratio, irrespective of the estimated amount of increase or decrease of the storage amount of oxygen, and makes a switch from the lean control to the rich control, when the air fuel ratio detected by the sensor becomes equal to or more than the lean determination threshold value.

* * * * *